United States Patent
Schaffer

[11] Patent Number: 6,021,318
[45] Date of Patent: Feb. 1, 2000

[54] TRANSCEIVER SWITCHOVER ARRANGEMENT

[75] Inventor: Josef-Paul Schaffer, Munich, Germany

[73] Assignee: Siemens Aktiengesellschaft, Munich, Germany

[21] Appl. No.: 09/017,181

[22] Filed: Feb. 2, 1998

[30] Foreign Application Priority Data

Feb. 4, 1997 [DE] Germany .......................... 197 04 151

[51] Int. Cl.[7] .............................. H04B 1/44; H04B 1/50
[52] U.S. Cl. .................... 455/78; 455/80; 455/83
[58] Field of Search .................... 455/78, 82, 83, 455/84, 553, 180.1, 188.1, 552, 101, 103, 129, 132, 133, 140, 170.1, 176.1, 193.1, 269; 333/101, 103, 104

[56] References Cited

U.S. PATENT DOCUMENTS 5,193,218  3/1993  Shimo ........................................ 455/80
5,513,382  4/1996  Agahi-Kesheh et al. ................ 455/83

FOREIGN PATENT DOCUMENTS 1 192 704  5/1965  Germany.

*Primary Examiner*—Dwayne D. Bost
*Assistant Examiner*—Temica M. Davis
*Attorney, Agent, or Firm*—Hill & Simpson

[57] ABSTRACT

In a transceiver switchover arrangement for alternating connection of a first and a second receiver apparatus, and a first and a second transmitter apparatus, with a single antenna, the first receiver apparatus and the first transmitter apparatus are designed for a first frequency band f1, and the second receiver apparatus and the second transmitter apparatus are designed for a second frequency band f2. By means of on-off switches, in connection with two line sections, of which each represents a quarter-wave line for f2, and which serially represent a quarter-wave line for f1, one of the apparatuses is coupled to the antenna according to the mode of operation.

9 Claims, 2 Drawing Sheets

TRANSCEIVER SWITCHOVER ARRANGEMENT

BACKGROUND OF THE INVENTION

1. Field of the Invention

The present invention relates to a transceiver switchover arrangement, in particular to a two-band transceiver switchover arrangement for the alternating connection of at least one first receiver apparatus and one second receiver apparatus and at least one first transmitter apparatus and one second transmitter apparatus with a single signal coupling/decoupling means, in particular an antenna. The first receiver apparatus and the first transmitter apparatus are designed for a first frequency band f1, and the second receiver apparatus and the second transmitter apparatus are designed for a second frequency band f2, with f2≈2*f1.

2. Description of the Prior Art

Circuit arrangements of this sort are required, for example, in many telecommunication systems in order to connect a receiving apparatus with the antenna—or with another signal coupling/decoupling means—in the reception mode, and to connect a transmitter apparatus with the antenna—or with another signal coupling/decoupling means—in the transmitting mode. In particular, this type of circuit arrangement is employed with mobile transceiver apparatuses, which must satisfy two different systems, e.g. GSM and PCN.

From U.S. Pat. No. 5,193,218, a transceiver apparatus is known that employs a switch that connects both the transmitter and the receiver to a common antenna via quarter-wave lines. In addition, from U.S. Pat. No. 5,513,382 such a circuit is known for a radiotelephone that connects, in alternating fashion, a transmitter circuit or a receiver circuit with a common antenna by means of two diodes and a quarter-wave line.

The transceiver switchover arrangements must fulfill the following requirements:

low insertion loss in the switched-on state
high insulation in the switched-off state
high signal-harmonics ratio
high intermodulation resistance
low current consumption; no current consumption, as far as possible, in the reception mode.

SUMMARY OF THE INVENTION

An object of the present invention is to provide a transceiver switchover arrangement of the type described above that in particular has a high intermodulation resistance. In addition, it should exhibit a low current consumption in the reception mode.

These objects are according to the invention in a transceiver switchover arrangement of the type initially described wherein a first on-off switching apparatus is arranged between a terminal for the first transmission apparatus and a terminal for the signal coupling/decoupling means, and wherein a second on-off switching apparatus is arranged between a terminal for the second transmitter apparatus and the terminal for the signal coupling/decoupling means. A first line section and a second line section connected serially therewith are provided between the terminal for the signal coupling/decoupling means and the terminal for the first receiver apparatus, these line sections being constructed so that each of these line sections for the second frequency band f2 respectively substantially represents a quarter-wave line, and so that the first line section, connected in series with the second line section for the first frequency band f1, substantially represents a quarter-wave line. A third on-off switching apparatus is connected between the first and the second line sections, and also is connected to a fixed potential. A fourth on-off switching apparatus is connected between the first and the second line sections, and also is connected with a terminal for the second receiver apparatus. A fifth on-off switching apparatus is connected to the terminal for the first receiver apparatus and also is connected to a fixed potential.

This transceiver switchover arrangement is operable in the following four operating modes:

a) In the operating mode "Transmission in the first frequency band f1," the first and the fifth on-off switching apparatus are in the on state and the remaining on-off switching apparatuses are in the off state. The series circuit of the two line sections is thus applied to the fixed potential, preferably to ground, via the fifth on-off switching means. Since the series circuit of the two line sections represents a quarter-wave line for the first frequency band f1, the short-circuit to the fixed potential is transformed into a no-load at the terminal for the signal on-off means. Accordingly, in this operating mode, only the first transmitting direction is effectively connected with the signal coupling/decoupling means.

b) In the operating mode "Transmission in the second frequency band f2," the second and the third on-off switching apparatuses are in the on state, and the remaining on-off switching apparatuses are in the off state. The first line section is applied to the fixed potential, preferably to ground, via the third on-off switching apparatus. Since the first line section represents a quarter-wave line for the second frequency band f2, the short circuit to the fixed potential is transformed into a no-load at the terminal for the signal coupling/decoupling means. Accordingly, in this operating mode only the second transmitting apparatus is effectively connected with the signal coupling/decoupling means.

c) In the operating mode "Reception in the first frequency band f1," all the on-off switching apparatuses are in the off state. The terminal for the signal coupling/decoupling means is connected, in accordance with the characteristic impedance, with the first transmitting apparatus for the first frequency band f1, via the first and second line section, which are connected in series. The rest of the circuit arrangement is disconnected.

d) In the last of the four possible operating modes, "Reception in the second frequency band f2," the fourth and the fifth on-off switching apparatus are in the on state, and the remaining on-off switching apparatuses are in the off state. The second receiver apparatus is thus connected, in accordance with the characteristic impedance, with the terminal for the signal coupling/decoupling means, via the first line section. The second line section is in turn applied to the fixed potential, preferably to ground, via the fifth on-off switching apparatus. Since the second line section for the second frequency band f2 represents a quarter-wave line, the short-circuit to the fixed potential is transformed into a no-load at the terminal for the second receive apparatus. Accordingly, in this operating mode only the second receiver apparatus is effectively connected to the signal coupling/decoupling means.

In a preferred embodiment, the first and the second line section are fashioned as striplines on a circuit board (PCB, multilayer board, etc.). In this way, the inventive circuit arrangement can advantageously be realized in particularly simple fashion.

The on-off switching apparatus are preferably switching diodes and associated current supply networks. In the on state of each on-off switching apparatus, the respectively associated switching diode is switched conductive, and is polarized (biased) in the blocking fashion in the off state. The energy consumption of the circuit arrangement is extremely low.

DESCRIPTION OF THE PREFERRED EMBODIMENTS

Figure 1:
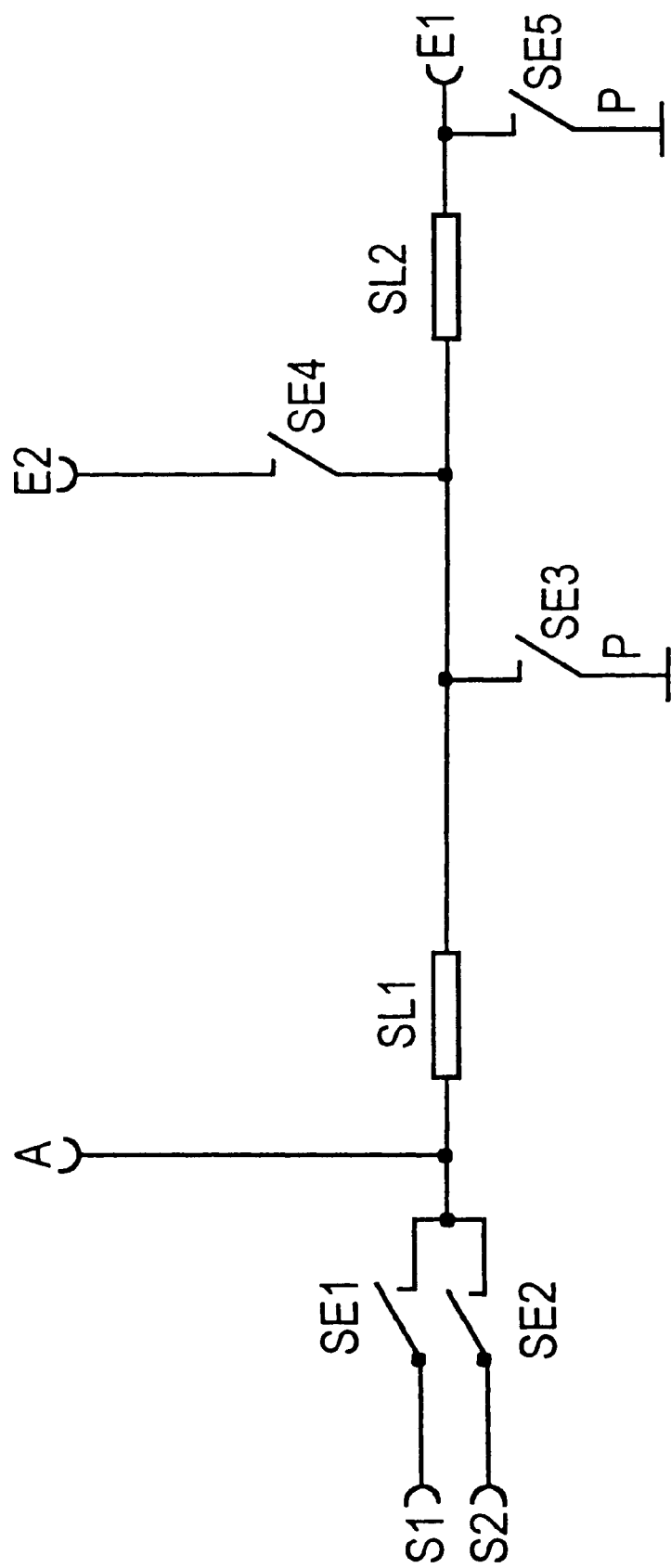
FIG. 1 is a schematic representation of a circuit diagram of the inventive transceiver switchover arrangement.

As shown in FIG. 1, the inventive transceiver switchover arrangement has a first on-off switching apparatus SE1 connected between a terminal S1 for a first transmitting apparatus that transmits in a first frequency band f1 and a terminal A for an antenna (signal coupling/decoupling means). A second on-off switching apparatus SE2 is connected between a terminal S2, for a second transmitting apparatus transmitting in a second frequency band f2, and the terminal A for the antenna.

In addition, the antenna terminal A is connected with a first receiver apparatus E1 for the first frequency band f1, via a first line section SL1 and via a line section SL2, which is connected downstream from this first line section SL1, as seen from the antenna terminal A. The first and the second line sections SL1 and SL2 are fashioned so that each of these line sections SL1 and SL2 for the second frequency band f2 substantially represents a quarter-wave line, and the first line section SL1, connected in series with the second line section SL2 for the first frequency band f1, substantially represents a quarter-wave line. Ideally, the second frequency band f2 substantially represents the doubled frequency of the first frequency band f1.

Third and fourth on-off switching apparatuses SE3 and SE4 are connected between the first and the second line sections SL1 and SL2, and with a fixed potential P, preferably ground, or with a terminal E2 for a second receive apparatus. A fifth on-off switching apparatus SE5 is connected between the terminal E1 for the first receiver apparatus and the fixed potential P. In the table 1 below, the operating states of this transceiver switchover arrangement are summarized.

Figure 2:
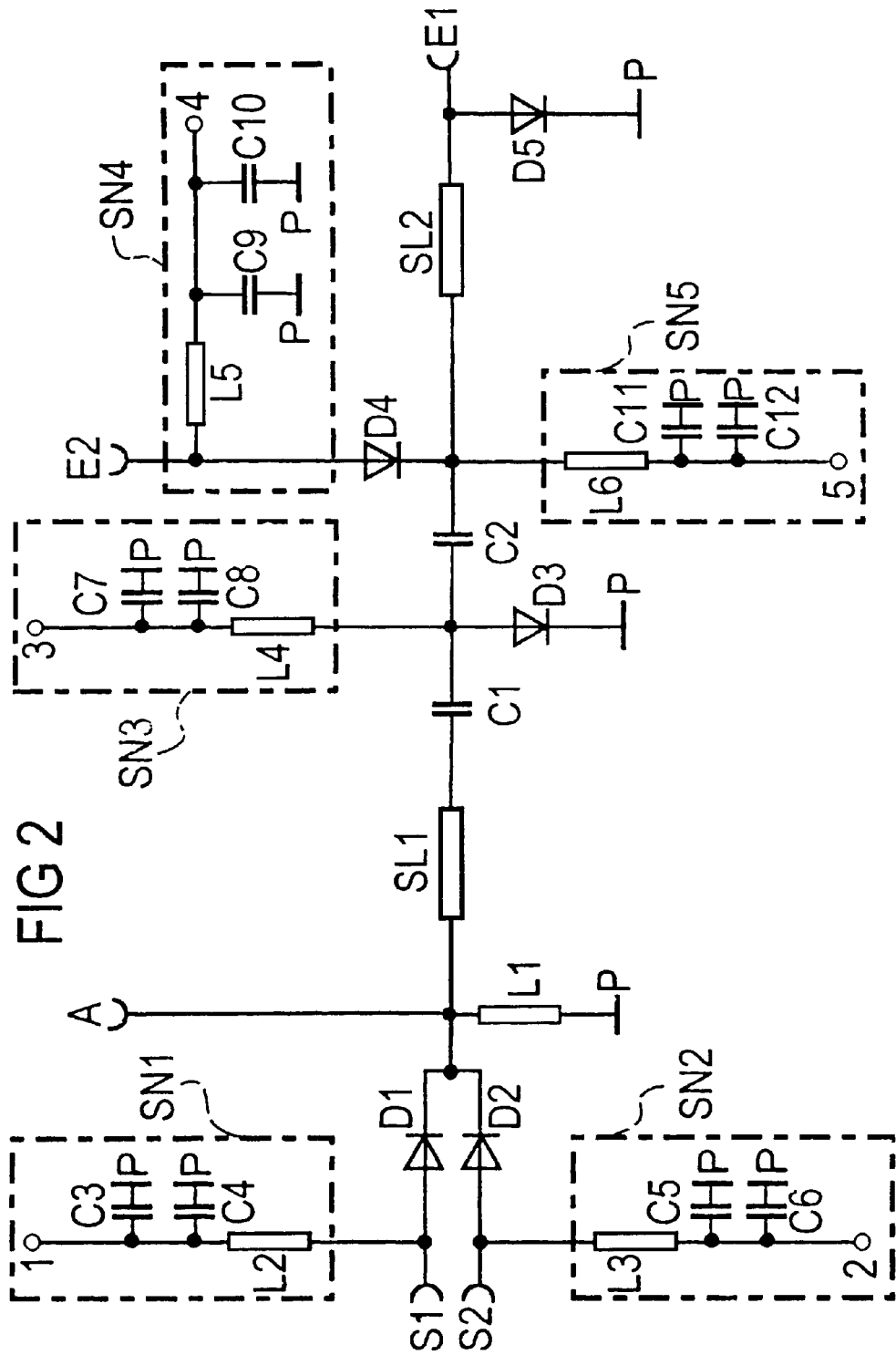
FIG. 2 shows circuit details of the exemplary embodiment.

The concrete exemplary embodiment according to FIG. 2, according to its operating state, conforms for example to the GSM (Global System for Mobile Communications) system or to the PCN (Personal Communication Networks) system (the frequency band f2 of the PCN system has substantially double the frequency of the frequency band f1 of the GSM system). The on-off switching apparatuses SE1 to SE5 are realized by diodes D1 to D5, in particular PIN diodes, and associated power supply networks SN1 to SN5. The power supply networks SN1 to SN5, each of which has a control terminal 1 to 5 for the application of a control signal, serve to switch the diodes D1 to D5 into the "conductive" or "blocking" state.

In the table 2 below, the operating states of the transceiver switchover arrangement according to the exemplary embodiment are summarized. In the off state of the on-off switching apparatuses SE1 to SE5, consisting respectively of a diode D1 to D5 and a current supply network SN1 to SN5, a voltage of −15V to ground is for example applied to the control terminal 1 to 5 allocated to the respective diode D1 to D5. In the on state, a current of, for example, 10 mA (transmitting modes) or 2 mA (receiver mode in the frequency band f2) flows via the respective diodes D1 to D5. This takes place by means of the application of a voltage to the corresponding control terminals 1 to 5.

The current supply networks SN1 to SN5 are for example conventional current supply networks used in mobile radio-telephone technology for switching diodes, consisting of capacitors C3 to C12 and inductances L2 to L6, and thus need not be further described herein. The capacitors C1 and C2 serve for the disconnection, in terms of direct current, of the on-off switching apparatus SE3, consisting of the current supply network SN3 and the diode D3, from the line sections SL1 and SL2. The inductance L1 serves for the disconnection, in terms of radio frequency, of the ground P from the antenna terminal A and from the transmission apparatus terminals S1 and S2.

In place of the diodes D1 to D5 with current supply networks SN1 to SN5, transistor arrangements, for example, or other circuit arrangements can be used as on-off circuit apparatuses SE1 to SE5. Accordingly, the inventive transceiver switchover arrangement is of course not limited to the above-described exemplary embodiment.

The functional characteristics of the above-described two-band transceiver switchover arrangement can be further improved by means of conventional matching elements, e.g. in stripline technology or discrete LC circuits, etc., at the terminals S1, S2, E1, E2 and A. If the transceiver apparatuses are connected with the transceiver switchover arrangement via suitable filters (e.g., SAW filters, stripline filters, LC filters, etc.), the insulating and intermodulation characteristics thereof can be further improved.

In the inventive transceiver switchover arrangement the intermodulation is very low in the transmitting mode, since not all of the blocking switching diodes D2 to D4 or D1, D4 and D5, lie immediately in parallel with the RF power. Moreover, in the receive mode the transceiver switchover arrangement uses extremely little electrical energy, so that the power supply batteries are conserved, in particular in mobile telephones.

TABLE 1

| Operating mode | State of the on-off circuit apparatus ||||| Explanation of manner of functioning |
| --- | --- | --- | --- | --- | --- | --- |
|  | SE1 | SE2 | SE3 | SE4 | SE5 |  |
| Transmission in the first frequency | On | Off | Off | Off | On | Transmission mode for the lower-frequency first frequency band f1. The two quarter-wave lines SL1, |

TABLE 1-continued

| Operating mode | State of the on-off circuit apparatus | | | | | Explanation of manner of functioning |
|---|---|---|---|---|---|---|
| | SE1 | SE2 | SE3 | SE4 | SE5 | |
| band f1 | | | | | | SL2 for f2 form a quarter-wave line for f1 with one another (since f2≈2*f1). The short-circuit to ground P through SE5 is thereby transformed into a no-load at the antenna terminal A. |
| Transmission in the second frequency band f2 | off | on | on | off | off | Transmission mode for the higher-frequency frequency band f2. The quarter-wave line SL1 for f2 between SE3 and the antenna terminal A transforms the short-circuit via S3 to ground P into a no-load at antenna terminal A. |
| Reception in the first frequency band f1 | Off | Off | Off | Off | Off | The receiver E1 for the first frequency band f1 is connected with the antenna terminal A via the two quarter-wave lines SL1, SL2, in accordance with the characteristic impedance. |
| Reception in the second frequency band f2 | Off | Off | Off | On | On | The receiver E2 for the second frequency band f2 is connected with the antenna terminal A via the quarter-wave line SL1, in accordance with the characteristic impedance. The short circuit through S5 to ground P is transformed by the quarter-wave line for f2 into a no-load at the terminal E2 for the second receiver. |

TABLE 2

| Operating mode | Switching state at the control terminal: | | | | | Remarks/measurement results (measured with an RF power of 28 dBm) |
|---|---|---|---|---|---|---|
| | 1 | 2 | 3 | 4 | 5 | |
| Transmission in the first frequency band f1 | 10 mA | −15 V | −15 V | −15 V | 10 mA | 0.5 dB insertion loss harmonic with 71 dB ratio IP3 at the output: 50 dBm |
| Transmission in the second frequency band F2 | −15 V | 10 mA | 10 mA | −15 V | −15 V | 0.5 insertion loss harmonic, with 71 dB ratio |
| Reception in the first frequency band f1 (GSM) | −15 V | −15 V | −15 V | −15 V | −15 V | 0.5 dB insertion loss. Essentially no current consumption. Only blocking current of the diodes D1 . . . D5. |
| Reception in the second frequency band f2 (PCN) | −15 V | −15 V | −15 V | 2 mA (D4, D5 conductive) | open | 0.67 dB insertion loss. Low current consumption. |

Although modifications and changes may be suggested by those skilled in the art, it is the intention of the inventor to embody within the patent warranted hereon all changes and modifications as reasonably and properly come within the scope of his contribution to the art.

I claim as my invention:

1. A transceiver switchover arrangement for alternatingly connecting at least one first receiver apparatus and one second receiver apparatus and at least one first transmitter apparatus and one second transmitter apparatus with a single signal coupling/decoupling element said first receiver apparatus and said first transmitter apparatus operating in a first frequency band and said second receiver apparatus and said second transmitter apparatus operating in a second frequency band, said transceiver switchover arrangement comprising:

a first on-off switching apparatus connected between a terminal of said first transmission apparatus and a terminal of said signal coupling/decoupling element;

a second on-off switching apparatus connected between a terminal of said second transmitter apparatus and said terminal of said signal coupling/decoupling element;

a first line section and a second line section connected at a node in series between said terminal of said signal coupling/decoupling element and a terminal of said first receiver apparatus;

each of said first line section and said second line section substantially representing a quarter-wave line for said second frequency band and said first line section connected in series with said second line section substantially representing a quarter-wave line for said first frequency band;

a third on-off switching apparatus connected between said node and a terminal for a fixed potential;

a fourth on-off switching apparatus connected between said node and a terminal of said second receiver apparatus; and a fifth on-off switching apparatus connected between a further node connecting said second line section and said terminal of said first receiver apparatus, and said terminal for a fixed potential.

2. A transceiver switchover arrangement as claimed in claim 1 wherein each of said first line section and said second line section comprises a stripline on a circuit board.

3. A transceiver switchover arrangement as claimed in claim 1 wherein said second frequency band is substantially double said first frequency band.

4. A transceiver switchover arrangement as claimed in claim 1 wherein each of said first, second, third, fourth and fifth on-off switching apparatuses has an on state with a current conducting direction associated therewith, and said transceiver switchover arrangement further comprising first, second, third, fourth and fifth diodes, respectively connected to said first, second, third, fourth and fifth on-off switching apparatuses, each of said first, second, third, fourth and fifth diodes being polarized in the current-conducting direction of the on-off switching apparatus to which it is connected.

5. A transceiver switchover arrangement as claimed in claim 1 further comprising an isolating filter connected at said terminal of said first transmitter apparatus.

6. A transceiver switchover arrangement as claimed in claim 1 further comprising an isolating filter connected at said terminal of said second transmitter apparatus.

7. A transceiver switchover arrangement as claimed in claim 1 further comprising an isolating filter connected at said terminal of said first receiver apparatus.

8. A transceiver switchover arrangement as claimed in claim 1 further comprising an isolating filter connected at said terminal of said second receiver apparatus.

9. A transceiver switchover arrangement as claimed in claim 1 comprising a plurality of isolating filters respectively connected at said terminal of said first transmitter apparatus, said terminal of said second transmitter apparatus, said terminal of said first receiver apparatus and said terminal of said second receiver apparatus.

* * * * *